May 13, 1958 E. A. GALLO 2,834,375
FUEL FLOW CONTROLLER
Filed Oct. 18, 1954
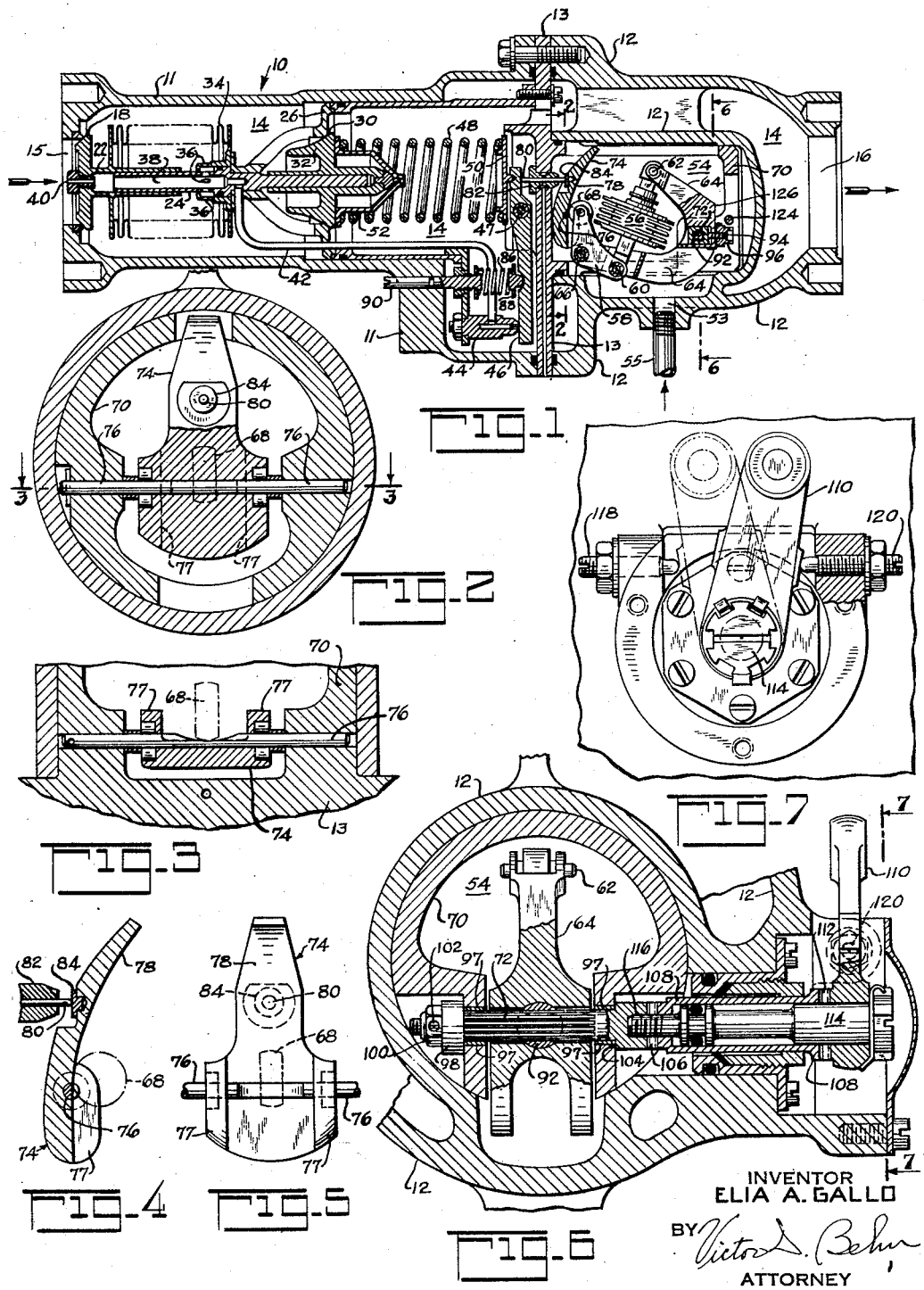
INVENTOR
ELIA A. GALLO
BY
ATTORNEY

United States Patent Office 2,834,375
Patented May 13, 1958

2,834,375

FUEL FLOW CONTROLLER

Elia A. Gallo, Englewood, N. J., assignor to Curtiss-Wright Corporation, a corporation of Delaware Application October 18, 1954, Serial No. 463,019

8 Claims. (Cl. 137—614.2)

This invention relates to apparatus for regulating the flow of fluid in accordance with changes in a control pressure such as is disclosed in copending application Serial No. 286,364 filed May 6, 1952, which issued as Patent Number 2,766,579 on October 16, 1956. The invention is more particularly directed to incorporation in such apparatus of a mechanism for varying the flow of fluid for a given control pressure.

The fluid flow regulating apparatus disclosed in said copending application regulates the flow of a fluid so that said flow is proportional to a control fluid pressure and is independent of changes in the pressure of the fluid being regulated. In the specific embodiment disclosed in said copending application the flow of fuel to an engine is regulated in proportion to a control pressure which in turn is proportional to the mass rate of air flow into the engine whereby a constant fuel-air ratio of the engine combustion mixture is maintained. As also disclosed in said copending application, with a conventional jet engine air inlet and for at least a limited range of flight speed, the mass airflow into the engine is substantially proportional to the impact pressure of the entering air relative to said engine. Accordingly said impact pressure can be used as the control pressure for regulating the fuel flow to the engine. For acceleration or deceleration from a particular flight speed, engine thrust is usually varied, for example by varying the fuel-air ratio of the engine combustion mixture. Therefore, provision should be made for adjusting the amount of fuel flow to the engine at any given control pressure.

An object of the present invention comprises a novel and simple mechanism for accurately providing a control force proportional to a control fluid pressure and further providing means for accurately varying this proportion.

Another object of the present invention comprises such a novel and simple mechanism in combination with a fluid flow regulating apparatus which regulates the flow of a fluid so that said flow is proportional to a control fluid pressure, the mechanism permitting variation of this proportion independently of the control fluid pressure. In the specific embodiment disclosed said mechanism controls the flow of fuel to an engine in proportion to a control fluid pressure such as the impact pressure referred to above and the mechanism permits accurate and rapid changes to be made in this proportion and thus in fuel-air ratio.

Other objects of this invention will become apparent upon reading the annexed detailed description in connection with the drawing in which:

Fig. 1 is an axial sectional view through fluid flow regulating apparatus embodying the invention;

Fig. 2 is an enlarged view taken along line 2—2 of Fig. 1;

Fig. 3 is an enlarged partial section of a view taken along line 3—3 of Fig. 2;

Fig. 4 is an enlarged sectional view of the lever shown in Fig. 1;

Fig. 5 is an enlarged end view of the concave surface of the lever shown in Fig. 1;

Fig. 6 is an enlarged sectional view taken along line 6—6 of Fig. 1; and

Fig. 7 is an enlarged view taken along line 7—7 of Fig. 6.

Referring first to Fig. 1, the fluid flow regulating apparatus 10 has a multi-part housing comprising end members 11 and 12 and an intermediate support member 13, said housing having a fluid passage 14 therethrough with a fluid inlet opening 15 in housing member 11 and a fluid outlet opening 16 in housing member 12. A main valve 18 is movable to regulate the rate of flow through the passage 14. The valve 18 has a sleeve 22 which extends in a downstream direction communicating with a hollow stem 24 which is supported within housing member 11 by a partition member 26. Said partition member 26 forms a valve seat 30 for a valve 32. The valve 32 is in series with and disposed downstream of the valve 18.

An elastic bellows 34 has one end attached to the partition 26 and its other end attached to a flange on the sleeve 22. Holes 36 provide communication between the interior of the bellows 34 and a passageway 38. The upstream end of said passageway 38 is in communication with the fluid inlet 15 upstream of the valve 18 through a restricted orifice member 40 and the downstream end of said passage includes a duct 42 terminating in a restricted discharge nozzle 44. The nozzle 44 discharges fluid flowing therethrough into the passageway 14 downstream of the valve 32.

A lever 46 is pivotally mounted on pin 47 in the fluid passage 14 with one end of said lever overlying the discharge end of the nozzle 44 to act as a fluid baffle therefor so that the fluid flow resistance of the nozzle 44 varies with the pivotal movement of said lever 46. A compression spring 48 is interposed between the lever 46 and the valve 32 for urging the lever in a direction for closing the nozzle 44 and urging said valve 32 in a valve closing direction. Thus one end of the spring 48 bears against a washer 50 which in turn bears against the lever 46 and the other end of said spring bears against a cup-shaped washer 52, the bottom of which bears against the hub of the valve 32.

The portion of the fluid flow regulating apparatus 10 described to this point is the same as that disclosed in the above cited copending application. The apparatus 10 also includes a chamber 54 formed in the housing 12 out of communication with the passage 14. A fluid under pressure is supplied to the chamber 54 through a passage 53 and duct 55 for controlling the rate of fluid flow through the passage 14. A sealed and at least partially evacuated bellows-type flexible diaphragm 56 is disposed in the chamber 54. One end of the bellows 56 is pivotally connected to one end of a bellcrank lever 58 by pivot pin 60 and the other end of said bellows is pivotally connected by pivot pin 62 to one end of an arm 64. The bellcrank lever 58 is pivotally mounted intermediate its ends by pivot pin 66 on the other end of the arm 64. A roller 68 is attached to the other end of the bellcrank lever 58. The arm 64 is mounted on a generally cylindrical extension 70 of the support member 13 for pivotal adjustment intermediate its end about the axis of a splined shaft 72. Another lever 74 is pivotally mounted intermediate its ends by a pin 76 secured thereto, said pin being journaled in the support extension 70. The pin 76 extends through a pair of spaced ears 77 projecting from said lever 74. The pivotal axes of arm 64, bellcrank lever 58 and lever 74 are all parallel to each other as illustrated in the drawing. Said lever has a concave circular portion 78 whose center of curvature lies on the axis of pivotal adjustment of arm 64. The roller 68 is in contact with the concave circular portion 78 of lever 74 and rolls thereon. The bellows 56, responsive to changes in the control fluid pressure in chamber 54, through the bell crank lever 58 and the roller 68 exerts a force on the lever 74. By pivotal adjustment of arm 64 the moment arm of said force can be increased or decreased thereby increasing or decreasing the turning moment exerted by said force on the lever 74. A pin 80 is slidably mounted in a bushing 82 secured to the support member 13. The pin 80 interconnects the lever 74 with the lever 46, one end of said pin 80 contacting a hardened contact button 84 carried by said lever 74 and the other end of said pin contacting the lever 46 so as to transmit the force from lever 74 to said lever 46 in opposition to the turning moment exerted on lever 46 by the spring 48. A compression spring 86 also acts against the lever 46. One end of the spring 86 engages a washer 88 bearing against said lever 46 and the other end of said spring bears against the end of a screw 90 which is adjustably anchored to the housing 11.

The pivot pin 76 extends through the two spaced ears 77 of the lever 74 and the ends of said pin are journaled in the support extension 70 as shown in Figs. 2 and 3. In addition, as best seen in Figs. 3 and 4, the pivot pin is so positioned and the part of the pin between the ears 77 so cut away to its axis flush with the adjacent circular portion 78 of the lever 74 that said flush pin part and circular portion form a continuous circular portion with the axis of said pin lying thereon.

Lever 74 is shown on a larger scale in Figs. 4 and 5. The pin 80 shown in Fig. 4 contacts the flat surface of the button 84. The plane of said flat surface of the button 84 is perpendicular to the direction of motion of said pin and said plane includes the pivotal axis of lever 74. Consequently, the turning moment produced by a friction force generated by relative sliding between the pin 80 and lever 74, if any, is minimized. Since the pivot pin 76 is cut away as described in the preceding paragraph, the roller 68 is free to roll along the circular portion 78 of lever 74 without interference from said pin 76. As best shown in Fig. 4, the roller 68 (shown in dash-dot) can contact the lever 74 very close to its pivotal axis. The interference which would occur between the roller 68 and the pin 76 when said roller approaches the pivot axis of lever 74 if the pin 76 were not cut away as described is clearly shown in this figure. Furthermore, because the pivot axis of the lever 74 is on the circular portion 78, the turning moment which could be produced by the small force of friction generated between said roller and said lever is minimized when the roller is close to the pivot axis since the moment arm of said friction force is, for all practical purposes, zero. The moment arm of said roller friction force on the lever 74 increases as the roller 68 is moved away from the pivot axis of said lever by adjustment of the arm 64. However, since said force of friction is always quite small and since the control force exerted by the pin 80 increases with such adjustment of the roller 68, the turning moment exerted by said roller friction force on the lever 74 is negligible throughout said range of adjustment.

The mounting of the arm 64 on the support extension 70 and the elements utilized to position said arm are best seen in Figs. 6 and 7. A plug 92 is disposed in a hole extending through the arm 64 at right angles to the pivotal axis of said arm, said plug having an opening therethrough through which the splined shaft 72 extends. The plug 92 has internal splines which mate with the splines on said shaft 72. One end of said plug, as shown in Fig. 1, has a threaded stem 94 attached thereto which extends through said arm. A nut 96 is threaded on said stem 94 for tightening the plug against the shaft 72 so that said shaft is drawn up tightly against the wall of the hole in the arm through which said shaft extends. The splined shaft 72 is journaled in the support extension 70 by bearings 97. A thrust collar 98 and nut 100 on said shaft 72 restricts lateral movement of said shaft towards the right as viewed in Fig. 6. A cotter pin 102 locks the nut 100 to said shaft. A shoulder 104 integral with said shaft restricts movement of said shaft in the opposite direction. The shoulder end of said shaft has radial splines 106 thereon which mate with like splines on one end of a hollow extension piece 108. An arm 110 with radial splines 112 is splined to the other end of said extension piece 108. A long cap screw 114 passes through the lever 110, and the hollow extension piece 108 and is threaded into a hole 116 in the splined shaft 72 thereby tightly drawing together said arm 110, extension piece 108 and splined shaft 72. With this construction, rotation of said lever 110 is transmitted to the arm 64 through said splined shaft 72 to rotatively adjust said arm with a minimum amount of play thereby causing pivotal movement of said arm resulting in movement of the roller 68 along the lever 74 as described above. Adjustable screws 118 and 120 are mounted on the housing member 12 for cooperation with the lever 110 to limit the rotative adjustment of said lever and therefore the moment arm produced by the roller 68 on the lever 74.

The lever 110, and extension piece 108 may be removed without disturbing the splined shaft 72 by withdrawing the cap screw 114. The housing member 12 may then be removed without disturbing the mechanism in chamber 54. A pin 124, shown in Fig. 1, passing through chamber 54 provides a rough stop to prevent the arm 64 from unrestrained rotation when the lever 110 is removed. Should the arm 64 tend to rotate, either the shoulder 126 on said arm, or the nut 96 will hit the pin thereby preventing further rotation. The roller 68, therefore, cannot inadvertently roll off either end of the lever 74 when the outer portions of the device are being assembled or disassembled.

With the apparatus described above, the flow of a fluid may be maintained proportional to a varying control pressure while the value of the proportion may be independently changed. As described in said copending application the flow of fluid through passage 14 is proportional to the force exerted on the lever 46 by the pin 80. The lever by its movements toward and away from the nozzle 44 respectively increases and decreases the flow resistance of said nozzle whereby the position of the regulating valve 18 and therefore the fluid flow rate through the passage 14 is controlled by movements of said lever 46. The range of movement of the lever 46 between its nozzle full open and nozzle full closed positions is very small being about .004" and consequently the range of movement of the pin 80 is also small. This movement of pin 80 for the specific embodiment disclosed and with the portion of the lever 46 overlying the nozzle 44 having a maximum range of movement of .004" is approximately .002".

Arm 64 is rotated by lever 110. Lever 110 may be moved either manually or automatically in response to a particular operating condition. By rotating said arm, the moment arm of the force exerted by the bellows 56 which is responsive to changes in control pressure may be varied. Thus the force exerted by the bellows 56 is responsive to control pressure while the moment arm of said force is determined by the pivotal adjustment of the arm 64. The movement of lever 74 is slight since the movement of the pin 80 which contacts said lever is very small as pointed out above. In the actual embodiment of this invention the radius of the curved portion 78 of lever 74 is 2–3". In any practical case this radius is very large compared to the range of movement (.002") of the pin 80. Therefore for all practical purposes the center of curvature of the curved portion 78 lies on the axis of pivotal adjustment of arm 64 throughout the range of pivotal movement of said lever 74. The pivotal adjustment of arm 64 and the pivotal movement of lever 74 will have no appreciable effect on the elastic force of the bellows 56, and the control force exerted by said bellows through the roller 68 on lever 74 is for all practical purposes directly proportional to the changes in control fluid pressure in chamber 54. The lever 74 and arm 64 are both mounted on the support extension 70 to facilitate accurately locating the center of curvature of the curved portion 78 on the pivotal axis of the arm.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. Mechanism for providing a control force comprising a support structure; an arm; means supporting said arm on said support structure for pivotal adjustment about an axis; a lever pivotally supported on said support structure, said lever having a concave circular portion with the center of curvature of said circular portion being substantially on the axis of adjustment of said arm; a flexible bellows; means for subjecting said bellows to a control pressure; and means operatively connecting said bellows to said arm and to said lever concave portion so that said bellows exerts a turning moment on said lever the moment arm of which varies with the pivotal adjustment of said arm; and means exerting a force on said lever to provide an opposing turning moment on said lever which increases and decreases with said first mentioned turning moment.

2. Mechanism for providing a control force comprising a support structure; an arm; means supporting said arm on said support structure for pivotal adjustment about an axis intermediate the ends of said arm; a flexible bellows having one end pivotally connected to one end of said arm; a first lever pivotally supported on said support structure, said first lever having a concave circular portion with the center of curvature of said circular portion being substantially on the axis of adjustment of said arm; a second lever pivotally connected intermediate its ends to the other end of said arm with the one end of said second lever being pivotally connected to the other end of said bellow and the other end of said second lever contacting said circular portion of said first lever whereby the point of contact of said second lever on said first lever varies with the pivotal adjustment of said arm; and means for subjecting said bellows to a control pressure such that said bellows, through said second lever, exerts a turning moment which increases and decreases with increase and decrease respectively in control pressure on said first lever; and means exerting a force on said first lever balancing said turning moment whereby said force increases and decreases with changes in said control pressure, and for a given magnitude of the control pressure the magnitude of the force depends on the pivotal adjustment of said arm.

3. Mechanism as recited in claim 2 in which the pivotal axis of said first lever lies substantially on said circular portion.

4. Apparatus for regulating the flow of a fluid through a passage; said apparatus comprising means operable to vary said flow; means providing a first force which increases and decreases with increase and decrease respectively of the flow through said passage; means providing a control fluid pressure; a mechanism for providing a control force which varies with changes in said pressure and which includes means for varying the magnitude of said force relative to said pressure; said mechanism comprising a support structure, an arm, means supporting said arm on said support structure for pivotal adjustment about an axis, a lever pivotally supported on said support structure, said lever having a concave circular portion with the center of curvature of said circular portion being substantially on the axis of adjustment of said arm; a flexible bellows responsive to said control fluid pressure and means operatively connecting said bellows to said arm and to said lever concave portion so that said bellows exerts a control force on said lever the moment arm of which varies with the pivotal adjustment of said arm; means responsive to changes in said forces; and means controlled by said responsive means for effecting operation of said flow varying means.

5. Apparatus for regulating the flow of a fluid through a passage, said apparatus comprising means operable to vary said flow; means providing a first force which increases and decreases with increase and decrease respectively of the flow through said passage; means for providing a control fluid pressure; a mechanism for providing a control force which increases and decreases with changes of said control fluid pressure and for adjusting the ratio of the magnitude of said control force to the magnitude of said control fluid pressure; said mechanism comprising a support structure, an arm, means supporting said arm on said support structure for pivotal adjustment about an axis, a flexible bellows responsive to changes in said control fluid pressure having one end pivotally connected to one end of said arm, a first lever pivotally mounted intermediate its ends on said support structure, said first lever having a concave circular portion with the center of curvature of said circular portion being substantially on the pivotal axis of said arm and a second lever pivotally connected intermediate its ends to the other end of said arm with the one end of said second lever being pivotally connected to the other end of said bellows and the other end of said second lever contacting said circular portion of said first lever; a device subject to said first force; means operatively connecting said device to said first lever so that said bellows, through said levers, exerts a control force on said device in opposition to said first force, said device being movable in response to changes in said forces acting thereon; and means responsive to movement of said device for effecting operation of said flow varying means.

6. An apparatus as recited in claim 4 in which the pivotal axis of said first lever lies substantially on the circular surface of said circular portion.

7. Apparatus for regulating the flow of a fluid through a passage, said apparatus comprising a first valve member movable to vary said flow; a second valve member disposed in said passage and urged in an opening direction by the fluid pressure differential across said second valve member resulting from the flow of said fluid through said passage; spring means for urging said second valve member in a closing direction against said pressure differential and providing a spring force which increases and decreases with increase and decrease respectively in said fluid flow; a first lever, said spring being operatively connected to said first lever for exerting a first turning moment thereon which increases with opening movement of said second valve; a mechanism for providing a second turning moment on said lever opposing said first turning moment; said mechanism comprising a support structure, an arm, means supporting said arm on said support structure for pivotal adjustment about an axis intermediate the ends of said arm, a flexible bellows having one end pivotally connected to one end of said arm, a second lever pivotally supported on said support structure, said second lever having a concave circular portion with the center of curvature of said circular portion being substantially on the axis of adjustment of said arm, a third lever pivotally connected intermediate its ends to the other end of said arm with the one end of said third lever being pivotally connected to the other end of said bellows and the other end of said third lever contacting said circular portion of said second lever such that the point of contact of said third lever on said second lever varies with the pivotal adjustment of said arm, means operatively interconnecting said first and second levers, and means for subjecting said bellows to a control pressure such that said bellows, through said second and third levers and said interconnecting means exerts a turning moment on said first lever which increases and decreases with increase in said control pressure and is in a direction opposite to the turning moment exerted by said spring; and means controlled by pivotal movement of said first lever in response to changes from a predetermined relationship between said turning moments for effecting opening and closing adjustments of said first valve member in a direction so as to restore said predetermined relationship.

8. Mechanism for providing a control force comprising a support structure; an arm; means supporting said arm on said support structure for pivotal adjustment about an axis; a first lever pivotally supported on said support structure; a second lever pivotally supported on said arm and having a portion engageable with said first lever; a flexible bellows; means for subjecting said bellows to a control pressure; means operatively connecting one end of said bellows to said arm and the other end of said bellows to said second lever so that said bellows exerts a turning moment on said first lever through said second lever the moment arm of which varies with the pivotal adjustment of said arm; and means exerting a force on said first lever to provide an opposing turning moment on said lever which increases and decreases with said first mentioned turning moment.

References Cited in the file of this patent

UNITED STATES PATENTS

| | | |
|---|---|---|
| 2,577,027 | McLeod | Dec. 4, 1951 |
| 2,625,167 | Gess | Jan. 13, 1953 |
| 2,753,882 | Bottoms | July 10, 1956 |